United States Patent [19]

Luedtke

[11] Patent Number: 5,481,215

[45] Date of Patent: Jan. 2, 1996

[54] COHERENT MULTIPLEXER CONTROLLER

[75] Inventor: Mark Luedtke, Del Valle, Tex.

[73] Assignee: Advanced Micro Devices, Inc., Sunnyvale, Calif.

[21] Appl. No.: 94,610

[22] Filed: Jul. 20, 1993

[51] Int. Cl.[6] .................... H03K 3/037; H03K 19/21
[52] U.S. Cl. .................. 327/218; 327/219; 327/225; 326/46; 326/52; 326/54
[58] Field of Search .................... 328/152, 154, 328/104, 63, 72; 307/269, 272.1, 471, 480, 243; 370/77, 78, 112; 327/99, 141, 144, 199, 407, 218, 219, 225; 326/52, 54, 46

[56] References Cited

U.S. PATENT DOCUMENTS 5,022,057  6/1991  Nishi et al. .......................... 328/63
5,111,455  5/1992  Negus .................................. 328/104
5,329,529  7/1994  Murphy et al. ..................... 307/243

Primary Examiner—Timothy P. Callahan
Assistant Examiner—Trong Phan
Attorney, Agent, or Firm—Jenkens & Gilchrist

[57] ABSTRACT

A control circuit for a multiplexer includes two inverters, and exclusive-NOR gate, and a d-type flip-flop. The multiplexer has two input terminals and two selection terminals, and the control circuit has two input terminals. One of the two inverters is connected in circuit between one of the two control circuit input terminals and one of the two multiplexer input terminals; the d-type flip-flop is coupled to the two multiplexer selection terminals; the exclusive-NOR gate is connected in circuit between the two control circuit input terminals and two of three input terminals of the d-type flip-flop; and the second inverter is connected in circuit between the exclusive-NOR gate and one of the three input terminals of the d-type flip-flop.

7 Claims, 1 Drawing Sheet

COHERENT MULTIPLEXER CONTROLLER

CROSS-REFERENCE TO RELATED APPLICATIONS

This application is related to the following U.S. patent applications:

| SER. NO. | TITLE | INVENTOR(S) |
| --- | --- | --- |
| 07/917497 (06940/0029; TT0139) | General I/O Port Interrupt Mechanism | Gulick, et al. |
| 07/917489 (06940/0030; TT0140) | Improved External Memory Access Control For a Processing Unit | Bowles, et al. |
| 07/917488 (06940/0031; TT0141) | Method of Weak Pull-up Disable and Mechanism Therefor for Use with Microcontroller in Integrated Circuit and Cordless Telephone Using the Integrated Circuit | Bowles, et al. |
| 07/917503 (06940/0032; TT0142) | Interrupt Mask Disable Circuit and Method | Bowles, et al. |
| 07/918627 (06940/0033; TT0143) | Integrated Circuit and Cordless Telephone Using the Integrated Circuit | Gulick, et al. |
| 07/918626 (06940/0034; TT0144) | Modulator Test System | Peterson, et al. |
| 07/918625 (06940/0035; TT0145) | Keypad Scanner Process and Device and Cordless Telephone Employing the Mechanism | Gulick |
| 07/918624 (06940/0036; TT0146) | Serial Interface Module and Method | Gulick, et al. |
| 07/918631 (06940/0037; TT0147) | Low Power Emergency Telephone Mode | Peterson, et al. |
| 07/918632 (06940/0038; TT0148) | In-Circuit Emulation Capability Mode in Integrated Circuit and Cordless Telephone Using the Integrated Circuit | Gulick, et al. |
| 07/918622 (06940/0039; TT0149) | Clock Generator Capable of Shut-down Mode and Clock Generation Method | Peterson, et al. |
| 07/918621 (06940/0040; TT0150) | Signal Averager | Gulick |
| 08/088007 (06940/0051; TT0174 | Apparatus and Method for Asynchronous Successive Approximation | Luedtke |

All of the related applications were filed on Jul. 21, 1992, except for the last listed, which was filed on Jul. 6, 1993; are assigned to the assignee of the present invention; and are; hereby incorporated herein in their entirety by this reference thereto.

BACKGROUND OF THE INVENTION

1. Field of the Invention

The present invention relates to multiplexers. More particularly, the present invention relates to multiplexers that may be called upon in operation to shift between unrelated inputs.

2. Description of Related Art

Multiplexing means transmitting a large number of information units over a smaller number of channels or lines. A digital multiplexer is a combinational circuit that selects binary information from one of many input lines and directs it to a single output line. The selection of a particular input line is controlled by a set of selection lines. Normally, there are $2^n$ input lines and n selection lines whose bit combinations determine which input is selected.

It is well known to those skilled in the art to combine several relatively low-bit-rate signals to form one relatively high-bit-rate signal to be transmitted over a high-frequency medium. Multiplexing is considered useful, generally, because it allows multiple signalling lines or channels that could not otherwise use the full capacity of a given data link to share that capacity, and therefore promote system efficiency.

In the multiplexing arts, it is possible that all channels will have identical bit rates. In such a case it is known to perform multiplexing on a bit-by-bit basis (known as bit or digital interleaving). It is also known in such a case to perform multiplexing on a word-by-word basis (known as byte or word interleaving). In such schemes, when the bit rate of incoming channels is not equal, the high-bit-rate channel may be allocated proportionately more slots. Further, it is evident that the minimum length of the multiplexer frame must be a multiple of the lowest common multiple of the incoming channel bit rates and, hence, such schemes are practical only when some fairly simple relationship exists among these rates.

Upon receipt at a destination terminal, the multiplexed digit stream must be divided and distributed to the appropriate output channel. To accomplish this, the destination or receiving terminal must be able to correctly identify each bit. This requires the receiving system to synchronize with the beginning of each frame, with each slot in each frame, and with each bit in each slot. This may be accomplished by adding "control bits" (e.g., framing bits and synchronization bits) to the data bits. As those skilled in the art are well aware, synchronization between all of the incoming channels and the multiplexer cannot be presumed. It is difficult to obtain synchronization even when all channels are nominally at the same rate. For example, it is known that small rises and drops in temperature can increase and decrease, respectively, pulse propagation velocity. If faster moving input pulses cannot be accommodated by the multiplexer, they must be temporarily stored. If, on the other hand, the rate of received pulses drops, the multiplexer may have vacant slots with no data. These vacant slots must be "stuffed" with dummy digits.

Obviously, if even in synchronously multiplexed systems data is rarely received at a synchronous rate, in pure asynchronous systems there are even more pronounced, although similar, problems to overcome to efficiently fill time slots. Heretofore, to multiplex asynchronous channels those skilled in the art have constructed so-called "statistical multiplexers", multiplexers which dynamically allocate time slots on demand. In such multiplexers, each input/output line has a buffer associated with it. For input, the multiplexer scans the input buffers, collecting data until a frame is filled, at which point it "sends" the frame. On output, the multiplexer receives a frame and distributes the slots of data to the appropriate output buffers.

All of the aforementioned types of multiplexers must be controlled. One of the common functions of multiplexers that must be so controlled is the function of switching between inputs, which may or may not be related. Switching between unrelated inputs, in particular, is a very important function to control well because it is frequently employed and because when it is performed poorly "glitches" occur at the multiplexer output.

Heretofore, there has not been developed a very simple, inexpensively constructable multiplexer control system that allows a multiplexer to switch between unrelated inputs without causing a glitch at the output. The lack of such a multiplexer control is a shortcoming and deficiency of the prior art.

SUMMARY OF THE INVENTION

The present invention overcomes the shortcomings and deficiencies mentioned above by providing a coherent multiplexer controller including only four elements, but which elements cooperate to allow a multiplexer to switch between unrelated outputs without causing glitches at the output of the multiplexer.

According to the teachings of the present invention a control circuit for a multiplexer includes two inverters, an exclusive-NOR gate, and a d-type flip-flop. More specifically, in embodiments of the present invention, the multiplexer has two input terminals and two selection terminals, and the control circuit has two input terminals. In those embodiments, one of the two inverters is connected in circuit between one of the two control circuit input terminals and one of the two multiplexer input terminals; the d-type flip-flop is coupled to the two multiplexer selection terminals; the exclusive-NOR gate is connected in circuit between the two control circuit input terminals and two of three input terminals of the d-type flip-flop; and the second inverter is connected in circuit between the exclusive-NOR gate and one of the three input terminals of the d-type flip-flop.

Accordingly, it is an object of the present invention to provide an improved coherent multiplexer controller.

Another object of the present invention is to provide a multiplexer system in which glitching at the output is minimized, if not eliminated.

Still yet another object of the present invention is to provide a multiplexer system in which switching between unrelated inputs is facilitated.

BRIEF DESCRIPTION OF THE DRAWINGS

For a more complete understanding of the present invention, and for further objects and advantages thereof, reference may now be made to the following detailed description taken in conjunction with the accompanying drawings in which.

DETAILED DESCRIPTION OF THE INVENTION

Figure 1:
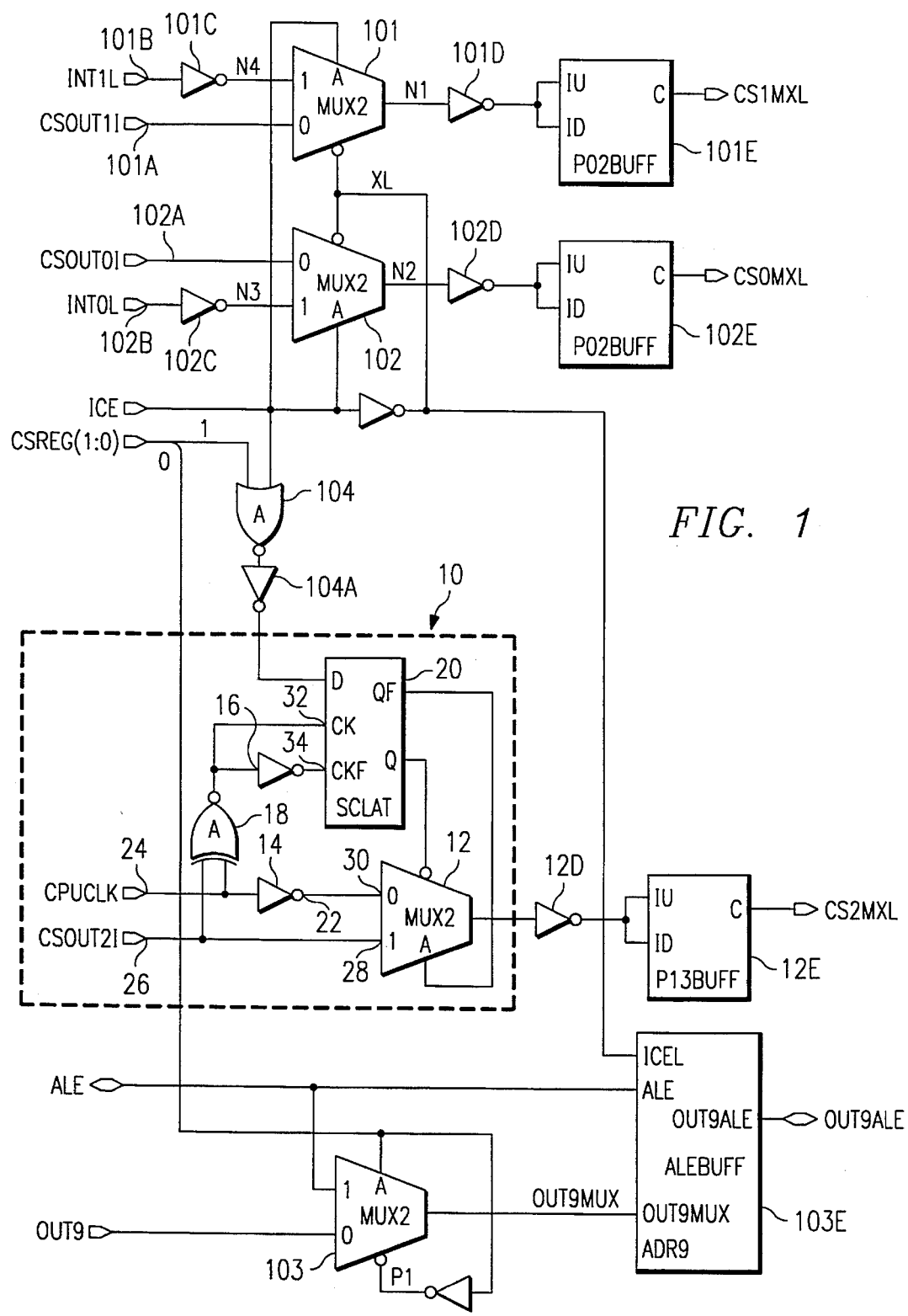
FIG. 1 is a schematic diagram of a coherent multiplexer controller according to the teachings of the present invention.

Referring now to the drawings wherein like or similar elements are designated with identical reference numerals throughout the several views and, more particularly, to FIG. 1, there is shown a schematic diagram of an embodiment of the present invention within an environment in which it may be incorporated. More specifically, there is shown in FIG. 1 a portion of a cordless telephone integrated circuit including within a dotted line 10 a multiplexer 12 and a control circuit for the multiplexer 12. As will be understood by workers of ordinary skill in the art, the portion of the telephone integrated circuit which is not included within dotted line 10 includes multiplexers 101, 102 and 103. Each of the multiplexers 101 and 102 has a control signal input 101A and 102A, respectively, together with another input signal 101B and 102B, respectively. The other input signals are fed through inverters 101C and 102C. The output of each of multiplexers 101 and 102 is fed through another inverter 101D and 102D, respectively, before being fed into buffers 101E and 102E, respectively. The outputs of the buffers are signals at the "C" terminals of the buffers. Similarly, multiplexer 103 has two inputs, as well as two control points, and a single output which is fed to a buffer 103E. The buffer 103E has a single output. The portion of the cordless telephone integrated circuit under discussion has an input to the control circuit for the multiplexer 12 (which circuit is the subject matter of the present invention and is discussed below) through an OR gate 104 and an inverter 104A. The output of multiplexer 12 is through an inverter 12D and a buffer 12E which has a single output. It may be seen in FIG. 1 that the multiplexer control circuit has only four elements: two NOT gates 14, 16; an exclusive-NOR gate 18; and a d-type flip-flop 20. Each of these elements and how they are interconnected is discussed in greater detail below.

NOT gates 14, 16 (or "inverters" as they are commonly called) perform negation operations. Conventionally, the NOT operation is denoted by B=!A that is to say, B is not A. The truth table for such a gate is:

| A (IN) | B (OUT) |
|---|---|
| 0 | 1 |
| 1 | 0 |

As is well-known to those skilled in the art, the circuit symbol for a NOT gate includes a "bubble" 22. This "bubble" 22 signifies inversion; if the "bubble" 22 were not present, elements 14, 16 would simply perform buffering operations (e.g., non-inverting unity gain operational amplifier operations).

As previously mentioned, gate 18 is an exclusive-NOR gate. As is known to those skilled in the art, the truth table for an exclusive-NOR gate (or "equivalence" gate, as they are sometimes called) is:

| A (IN$_1$) | B (IN$_2$) | C (OUT) |
|---|---|---|
| 0 | 0 | 1 |
| 0 | 1 | 0 |
| 1 | 0 | 0 |
| 1 | 1 | 1 |

Flip-flop 20 is a d-type flip-flop. The main purpose of such elements is to store and delay bits. D-type flip-flops synchronize data to the clock signal. The label SCLAT of d-type flip-flop 20 further characterizes it as a "Synchronous Clear Latch." It has a data input D, a clock input labeled CK, and a clear input labeled CKF.

Referring still to FIG. 1, the interconnection the aforementioned elements in an embodiment of the present invention are clearly shown. The two inputs to the control circuit 12 are two clock signals: CPUCLK 24 AND CSOUT2I 26. The CPUCLK signal 24 is input to the inverter 14 and to one input terminal of the exclusive-NOR gate 18. The CSOUT2I signal 26 is input to the other input terminal of the exclusive-NOR gate 18 and to the 1 input terminal 28 of the multiplexer 12. The output of the inverter 14 is input to the O input terminal 30 of the multiplexer 12.

The output of the exclusive-NOR gate 18 is applied directly to the flip-flop 20 and is also applied to it after a negation operation effected by the inverter 16. The direct and inverted signals from the exclusive-NOR gate 18 are applied to the terminals designated by reference numerals 32 and 34 in FIG. 1.

The aforementioned exclusive-NOR gate output signals control the sampling of the flip-flop 20. As those skilled in the art are well aware, in conventional operation of the flip-flop 20, if data ("D") is sampled at a time when it is equal to 1, the Q output goes to 1, placing the circuit in the set state. If D is 0, output Q goes to 0 and the circuit switches to the clear state. In operation, therefore, the flip-flop 20 can hold data in internal storage. The binary information present at the data input of the d-type flip-flop is transferred to the Q output as long as the flip-flop is enabled. When disabled, the binary information that was present at the data input at the time the pulse transition occurred is retained at the Q output until the pulse input is enabled again.

Referring still to FIG. 1, it may be seen that the Q output of the flip-flop 20, as well as its complement (QF), are used to effect selection of inputs at the multiplexer 12. The selected input of the multiplexer 12, i.e., either the CPUCLK signal 24 or the CSOUT2I signal 26, is the output of the multiplexer 12.

In operation of the entire control circuit for the multiplexer 12, it should be appreciated that the direct and inverted controlled sampling of the flip-flop 20, coupled with direct (Q) and complement (QF) selection control of the multiplexer 12 and with the inherent storage operation of the flip-flop 20, allows switching between two unrelated inputs without glitching the output. This constitutes an important advance over the prior art, that has heretofore suffered with glitches in many such applications, especially in which the inputs were clocks. A particular advantage of the particular embodiment of the present invention depicted in FIG. 1 is its simplicity. It can also be built relatively inexpensively because it uses very few components and only standard gates.

From the foregoing it can be seen that in the operation of the control circuit for multiplexer 12, a clock signal is input at 24. It is split and forms one input to exclusive-NOR gate 18 and the other side of the split is inverted at inverter 22 and serves as input 30 at one input terminal of the multiplexer 12. Another clock signal is input at 26 and it, too, is split. One side of the split forms an input to exclusive-NOR gate 18, while the other side of the split forms an input at 28 for multiplexer 12. The output of exclusive-NOR gate 18 is split, and one side of the split is input at the clock input of the d-type flip-flop, while the other side of the split is inverted and input at the clear input of the d-type flip-flop 20. As pointed out above, the d-type flip-flop 20 responds to its input signals to give an output at Q of one if the D signal is equal to one and zero if D is 0. These outputs at Q occur when the flip-flop is enabled by the enabling signals from the NOR gate 18. The Q signal is held when the flip-flop is disabled, which disablement occurs in response to the disabling signal from the NOR gate 18. Thus the presentation of the output at Q to a selection input of multiplexer 12 for controlling it and the complementary presentation of the output at QF to the other selection input of multiplexer 12 for the same purpose is done in exact synchronism with presentation of the signals CPUCLK (inverted) and CSOUT21 to multiplexer 12, that is, the signals which become its output, thereby avoiding glitches.

Obviously, numerous modifications and variations are possible in view of the teachings herein. Accordingly, within the scope of the appended claims, the present invention may be practiced otherwise than as specifically described herein.

What is claimed is:

1. A control circuit for a multiplexer, said multiplexer having a first multiplexer input terminal, a second multiplexer input terminal, a first selection terminal, and a second selection terminal, said control circuit comprising:

a first controller input terminal;

a second controller input terminal;

a first inverter connected in circuit between said first controller input terminal and said first multiplexer input terminal;

a d-type flip-flop, said d-type flip-flop having three input terminals, said d-type flip-flop having two output terminals, one output terminal being connected in circuit to said first selection terminal and the other output terminal connected in circuit to said second selection terminal;

an exclusive-NOR gate connected in circuit between said first controller input terminal and said second controller input terminal, and two of said three input terminals of said d-type flip-flop;

a second inverter connected in circuit between said exclusive-NOR gate and one of said three input terminals of said d-type flip-flop; and means for inputting a data signal to the third input terminal of said d-type flip-flop whereby a control signal derived from said data signal is applied to a selection terminal of said multiplexer at times avoiding glitching being processed through said multiplexer.

2. The control circuit as recited in claim 1, wherein said two output terminals of said d-type flip-flop are of Q and QF types.

3. The control circuit as recited in claim 1, wherein one of said three input terminals of said d-type flip-flop is of the CK type.

4. The control circuit as recited in claim 3, wherein another of said three input terminals of said d-type flip-flop is of the CKF type.

5. The control circuit as recited in claim 4, wherein the third of said three-input terminals of said d-type flip-flop is a D input.

6. The control circuit as recited in claim 4, wherein said two of said three input terminals of said d-type flip-flop to which said exclusive-NOR gate is connected in circuit to are one of the CK type and one of the CKF type.

7. The control circuit as recited in claim 6, wherein said second inverter is connected in circuit between said exclusive-NOR gate and said CKF type input terminal.

\* \* \* \* \*

UNITED STATES PATENT AND TRADEMARK OFFICE
CERTIFICATE OF CORRECTION

PATENT NO. : 5,481,215      Page 1 of 3
DATED : Jan. 2, 1996
INVENTOR(S) : Luedtke It is certified that error appears in the above-indentified patent and that said Letters Patent is hereby corrected as shown below:

Column 1, table line 23  Delete "(06940/0035;"

Column 1, table line 24  Delete "TT0145)"

Column 1, table line 27  Delete "(06940/0036;"

Column 1, table line 28  Delete "TT0146)"

Column 1, table line 30  Delete "(06940/0037;"

Column 1, table line 31  Delete "TT0147)"

Column 1, table line 33  Delete "(06940/0038;"

Column 1, table line 34  Delete "TT0148)"

Column 1, table line 38  Delete "(06940/0039;"

Column 1, table line 39  Delete "TT0149)"

Column 1, table line 41  Delete "(06940/0040;"

Column 1, table line 42  Delete "TT0150)"

UNITED STATES PATENT AND TRADEMARK OFFICE
CERTIFICATE OF CORRECTION

PATENT NO. : 5,481,215  Page 2 of 3
DATED : Jan. 2, 1996
INVENTOR(S) : Luedtke

It is certified that error appears in the above-indentified patent and that said Letters Patent is hereby corrected as shown below:

Column 1, table line 44   Delete "(06940/0051;"

Column 1, table line 45   Delete "TT0174"

Column 6, line 25   After "terminal"
Insert --being--

Column 6, line 39   After "glitching"
Insert --of signals--

UNITED STATES PATENT AND TRADEMARK OFFICE
CERTIFICATE OF CORRECTION

PATENT NO.   :   5,481,215             Page 3 of 3
DATED        :   Jan. 2, 1996
INVENTOR(S)  :   Luedtke It is certified that error appears in the above-indentified patent and that said Letters Patent is hereby corrected as shown below:

Column 1, table line 2    Delete "(06940/0029;"

Column 1, table line 3    Delete "TT0139)"

Column 1, table line 5    Delete "(06940/0030;"

Column 1, table line 6    Delete "TT0140)"

Column 1, table line 8    Delete "(06940/0031;"

Column 1, table line 9    Delete "TT0141)"

Column 1, table line 14   Delete "(06940/0032;"

Column 1, table line 15   Delete "TT0142)"

Column 1, table line 17   Delete "(06940/0033;"

Column 1, table line 18   Delete "TT0143)"

Column 1, table line 20   Delete "(06940/0034;"

Column 1, table line 21   Delete "TT0144)"

Signed and Sealed this

Twenty-seventh Day of May, 1997

Attest:

BRUCE LEHMAN

*Attesting Officer*     *Commissioner of Patents and Trademarks*